2,860,949

PLUTONIUM SEPARATION METHOD

Loren J. Beaufait, Jr., San Pablo, Frederick R. Stevenson, Santa Rosa, and Gerhard K. Rollefson, Berkeley, Calif., assignors to the United States of America as represented by the United States Atomic Energy Commission No Drawing. Application November 20, 1953
Serial No. 393,528

6 Claims. (Cl. 23—14.5)

The present invention relates to the decontamination of actinide rare earths and particularly this invention is concerned with a carrier precipitation process for separation and decontamination of plutonium with respect to uranium and uranium fission products and the separation of these elements from each other.

It is known that plutonium obtained by neutron bombardment of uranium is present in extremely small concentrations relative to the quantity of uranium. The neutron-irradiated uranium mass also contains a substantial amount of the radioactive fission products which comprise approximately the elements having atomic numbers 32 to 64, inclusive.

Since plutonium is present in only extremely small quantities relative to the uranium, separation of plutonium and decontamination thereof with respect to the uranium and radioactive fission products requires special techniques. One such technique is the precipitation of the plutonium from solutions in which it is present in minute concentration with a carrier precipitate. A carrier precipitate is a non-radioactive salt having similar crystalline characteristics which is coprecipitated with the plutonium.

An object of the instant invention is to provide a carrier-precipitation method for the separation of plutonium from contaminants wherein at least partial decontamination of said plutonium with respect to such contaminants as uranium, uranium fission products, and mixtures thereof is effected simultaneously with said separation of plutonium from aqueous solution.

An additional object of the instant invention is to provide a process for the separation of fission products such as niobium and zirconium from aqueous solutions and whereby said fission product values can be separated from aqueous solutions containing uranium values.

Other objects and advantages of the present invention will be apparent upon examination of the description following.

In accordance with the present invention it has been found that plutonium in the tetravalent state may be carried from an aqueous solution, even when present in said solution in minute concentration, by removing a ferric hydroxide precipitate from said solution. We have further found that plutonium may be recovered in a purified state from a mixture of plutonium, uranium and fission products by the following process. A dilute uranyl nitrate solution containing plutonium and fission products is formed. An acetate buffer containing sufficient excess acetate ion to complex the uranium present is then added to the solution. A ferric hydroxide precipitate is then separated from the solution carrying with it the plutonium (which is present in the solution in the tetravalent state) and the fission products such as zirconium and niobium which are carriable by ferric hydroxide. The precipitate is dissolved, the plutonium oxidized to the hexavalent state, and the solution treated with a ferric hydroxide precipitate. This ferric hydroxide precipitate will remove the fission products present, leaving the hexavalent plutonium in a purified state in the solution. The purified plutonium may then be recovered from the solution by an additional precipitation step, or other suitable method.

In accordance with the preferred embodiment of this invention, plutonium is recovered from dilute aqueous solutions thereof by treating the solution with a basic compound of iron at a pH between 4 and 7, and preferably between about 5 and 6, within which latter pH range the coprecipitation and carrying of plutonium with the basic iron compound is optimum. The effectiveness of the coprecipitation of basic ferric hydroxide with associated tetravalent plutonium values appears to be a function of the pH in the solution and increases greatly between pH values of 5 and 6. The optimum pH range for the process of this invention can be maintained in the aqueous plutonium-containing solution by incorporating therein an acetate buffer.

The ferric hydroxide employed in accordance with this invention may be formed either prior to its incorporation in the plutonium-containing solution or formed in the solution. However, since plutonium is carried quantitatively when the basic ferric compound is formed in situ within the plutonium-containing solution, precipitation of the iron colloid is preferably effected in the solution containing the metal values to be carried therewith. However, the ferric ion concentration in the treated solution is preferably not substantially in excess of 0.005 M when it is precipitated directly within the plutonium-containing solution.

Throughout the instant specification the term "carrier" is employed to denote a substantially water insoluble solid compound capable of ionizing to yield at least one inorganic cation and at least one anion identical with an ionic component of the compound which contains the ion of the metal value to be carried, and which latter compound is substantially as insoluble as the carrier therefor.

The particular form of ferric hydroxide which is especially resistant to acid solutions and is therefore particularly well suited for use as a decontaminating agent in acid solutions is the form known as the meta form which is obtained by hydrolysis of solutions of the acetate and which is distinguishable from readily acid-soluble iron sols. In the solid phase it is probable that the ferric hydroxide suspensions contain a certain amount of acetate. However, for convenience the applicants employ, throughout this specification, the term "ferric hydroxide" by which term is meant to include either or both the ferric hydrous oxide and the basic ferric acetate, and therefore refers to any solid phase obtained upon addition of a base such as ammonium hydroxide to an acid system containing iron and particularly to the acetate-buffered solutions within the aforementioned range of pH. Likewise it is to be strictly understood that the expressions "associated plutonium values" and "associated fission product values" as used throughout the instant specification and claims are intended to refer to the solid phase obtained coextensively with the precipitation of said colloidal iron from solutions having a pH between 4 and 7, which terms are intended to cover all plutonium-containing or fission product-containing precipitates formed by coprecipitation with said iron and which may be isomorphous therewith.

The process of the present invention can also be employed for the recovery of plutonium values from uranium and fission product values such as are obtained by dissolving neutron-irradiated uranium in a suitable acid.

Similarly to the tetravalent plutonium, certain fission product values, and particularly niobium and zirconium fission product values, are readily coprecipitated with and readily carried by the colloidal ferric hydroxide, precipitated in accordance with the process of this invention.

Thus, separations of said fission product values from either hexavalent plutonium values or the acetate-complexed uranium values can be readily effected. The following examples will further illustrate the embodiments of the present invention.

EXAMPLES

In all experiments tabulated in Table I tetravalent plutonium values were added to aqueous solutions containing uranyl ions in the amounts shown in the table. An acetate buffer was then added to the solution in an amount sufficient to produce the pH shown in the table. Three moles of acetate in excess of the buffer requirement were added per each mole of uranyl present to complex the uranyl ion. Ferric nitrate was added in an amount sufficient to bring the final concentration of ferric ions to 0.005 M and the solution in all cases was heated for 30 minutes at 75° C. to form and coagulate ferric hydroxide. Although heating was continued for 30 minutes, precipitation was substantially complete within 15 minutes and, in the absence of uranyl ion and in the presence of a large excess of acetate, precipitation of the iron colloid and the associated plutonium values was effected within a one-minute period. The precipitate was removed by centrifuging and the supernatant liquid analyzed for plutonium by counting the alpha particles emitted per unit time from aliquot samples mounted upon and evaporated from a suitable supporting base. The uranyl compound also tended to precipitate along with the ferric hydroxide when the concentration of uranyl ion in the treated solution was as high as 0.5 M, but this did not occur when the concentration was 0.25 M. From the results tabulated below, it is apparent that when the molarity of the uranyl ion was limited to 0.25 approximately 98 percent of the plutonium was carried by the precipitated iron.

Table I

CARRYING OF $Pu^{+4}$ IN THE ACETIC ACID-ACETATE BUFFER WITH URANYL ION PRESENT

| Sample No. | pH | $UO_2^{++}$ (M) | HAc+Ac-Ac (M) | Counts/min. in Supernatant | Counts/min. Original Solution | Percent Pu in Supernate |
|---|---|---|---|---|---|---|
| 1 | 5.7 | 0.50 | 1.7 | 125<br>68 | 1,300 | 9.6<br>5.2 |
| 2 | 5.7 | 0.50 | 1.7 | 2,520<br>2,600 | 21,400 | 11.5<br>11.8 |
| 3 | 5.7 | 0.25 | 0.95 | 26<br>30 | 1,400 | 1.8<br>2.2 |
| 4 | 5.7 | 0.25 | 0.95 | 65<br>63 | 4,300 | 1.5<br>1.4 |
| 5 | 5.7 | 0.25 | 0.95 | 540<br>330 | 21,400 | 2.6<br>1.5 |
| 6 | 5.7 | 0.25 | 0.95 | 430<br>460 | 21,400 | 2.0<br>2.1 |

Following the removal of the plutonium from the uranium and fission products not carriable with ferric hydroxide, the ferric hydroxide carrier precipitate is dissolved, the plutonium values oxidized to the hexavalent state and a ferric hydroxide precipitate removed from the solution, thus carrying from the solution the fission products and leaving the plutonium in the supernatant solution in a purified state. The precipitate is readily dissolved in a mineral acid such as nitric acid. The plutonium can be oxidized from the tetravalent to the hexavalent state by any conventional oxidizing agent having an oxidation potential more negative than about −1.11 electron volts. Bismuthate, permanganate and dichromate agents are particularly suitable. Following the oxidation of the plutonium, the solution is treated with a ferric hydroxide precipitate in the same manner as previously set forth. The fission products which were carried by the original ferric hydroxide precipitate from the uranyl solution will again be carried from the solution, thus leaving the hexavalent plutonium, in a substantially purified state.

The oxidation of the plutonium and the non-carriability of hexavalent plutonium by a ferric hydroxide carrier precipitate are demonstrated by the experiments tabulated in Tables II and III respectively. In the examples tabulated in Table II plutonium values were added to a solution 0.10 M in nitric acid and containing 0.05 M $KMnO_4$, and 0.1 M uranyl ion. (The uranyl ion was present in the solution, since it was contemplated that following the oxidation of the plutonium, and separation of a by-product (fission product) carrier precipitate of ferric hydroxide from the solution containing the oxidized plutonium, the purified plutonium would be carried from the solution with a sodium uranyl acetate carrier.) Following the oxidation step, the solution was tested for the presence of tetravalent plutonium ion by removing a lanthanum fluoride precipitate from the solution. Lanthanum fluoride carries tetravalent plutonium ion substantially quantitatively, but does not carry the plutonyl or uranyl ions. The non-carriability of the plutonium hexavalent ion was demonstrated by treating the solution with a ferric hydroxide precipitate as described previously for the plutonium tetravalent carrying step. In all examples the time of precipitation was 30 minutes and the temperature of the solution during coagulation of the precipitate was maintained at 75° C. It is apparent from the data shown in the table that the use of ferric hydroxide as a decontaminating agent will not result in the loss of more than one or two percent of the plutonium.

Table II

THE OXIDATION OF PLUTONIUM BY PERMANGANATE $UO_2^{++}=0.10$ M
$MnO_4^{-}=0.050$ M
$H^{+}=0.10$ M

| No. | Time | Temp. | Counts/min. Carried by $LaF_3$ Procedure | Counts/min. Original | Percent $Pu^{+4}$ by $LaF_3$ Procedure |
|---|---|---|---|---|---|
| 1 | 50 min | 75° C | 33<br>20 | 945 | 3.5<br>2.1 |
| 2 | 11 hrs | 75° C | 76<br>19 | 6,540 | 1.2<br>0.3 |
| 3 | 60 min | R. T. | 46<br>64 | 3,925 | 1.2<br>0.6 |
| 4 | 180 min | R. T. | 42<br>37 | 3,925 | 1.1<br>0.9 |
| 5 | 12 hrs | R. T. | 27<br>25 | 6,540 | 0.4<br>0.4 |

Table III

THE CARRYING OF $Pu^{VI}$ BY $Fe(OH)_3$ IN HAc-Ac BUFFERS WITH PERMANGANATE AS HOLDING OXIDANT

| No. | Time of Oxidation, min. | Temp. of Oxidation | $UO_2^{++}$, M | $MnO_4^{-}$, M | pH | Counts/min. in Ppt. | Counts/min. Original | Percent Pu Ppt. |
|---|---|---|---|---|---|---|---|---|
| 1 | 50 | 75° C | 0.033 | 0.017 | 5.3 | 26<br>29 | 945 | 2.8<br>3.1 |
| 2 | 150 | R. T. | 0.033 | 0.050 | 5.3 | 87<br>67 | 6,540 | 1.3<br>1.0 |
| 3 | 270 | R. T. | 0.010 | 0.050 | 5.7 | 213<br>355 | 21,400 | 1.0<br>1.7 |

While the instant process is designed primarily to remove materials present in the colloidal state in plutonium and uranium process solutions, the process of the instant invention demonstrates that ferric hydroxide is also effective as an over-all decontaminating agent.

Ferric hydroxide also serves as a carrier to decontaminate aqueous solutions with respect to beta-emitting fission products of niobium and zirconium such as plutonium process by-product solutions, containing only uranium and radioactive fission products. Beta decontamination factors as high as 2900 were obtained with a preformed ferric hydroxide carrier upon solutions containing up to 5 percent niobium in accordance with the instant process for carrying of plutonium in an acetate-buffered aqueous system. Using a ferric hydroxide carrier formed in situ in solutions containing about 7 percent niobium and zirconium effected a beta decontamination value up to 5100.

While the foregoing examples and general descriptions are illustrative of specific embodiments of the instant invention, it is clearly understood that said invention is not to be so limited since it is readily apparent to those skilled in the art that the subject invention is capable of numerous alterations and modifications without departure from the scope of the claims appended hereto.

What is claimed is:

1. The method of recovering plutonium ions from neutron-irradiated uranium ions which comprises forming an aqueous solution containing uranium ions, tetravalent plutonium ions and ions of fission products, buffering said solution to a pH of 4-7, adding sufficient excess acetate ion to the solution to complex the uranyl ion present, treating the solution with a ferric hydroxide precipitate, separating said precipitate together with associated plutonium ions and ions of fission products from the solution, dissolving said carrier precipitate in an aqueous mineral acid solution, oxidizing the plutonium values present in the solution to the hexavalent state, treating the resultant solution with a ferric hydroxide precipitate, and then separating said precipitate together with associated ions of fission products from the solution containing the purified plutonium ions.

2. The method of claim 1 wherein the solution from which the carrier precipitate is removed is buffered to a pH of 5-6.

3. The process of claim 1 wherein the ferric hydroxide carrier precipitate is formed in the solution from which it is removed.

4. The process of claim 1 wherein the ferric hydroxide carrier precipitate is preformed and then introduced into the solution containing the ions to be carried.

5. The the method of recovering tetravalent plutonium ions from a uranyl solution which comprises buffering said solution to a pH of 4-7, adding sufficient excess acetate ion to the solution to complex the uranyl ion present, introducing a ferric hydroxide precipitate into said solution, and separating said precipitate together with associated tetravalent plutonium ions from the solution.

6. The method of recovering plutonium ions from an aqueous solution containing plutonium ions, uranium ions and ions of fission products which comprises buffering said solution to a pH of 5-6 with an acetic acid-acetate buffer, adding a source of acetate ions to the solution in a proportion of 3 moles of acetate ion per mole of uranyl ion present, adding a source of ferric ions to the solution in quantity sufficient to make the solution 0.005 M in ferric ion, then heating the solution for 30 minutes at 75° C. to coagulate a ferric hydroxide carrier precipitate, then separating the ferric hydroxide carrier precipitate thus formed together with associated plutonium ions and ions of fission products, dissolving said carrier precipitate in an aqueous nitric acid solution, treating said solution with permanganate ion in quantity sufficient to oxidize the plutonium values to the hexavalent state, and then reforming in the solution a ferric hydroxide carrier precipitate and removing said precipitate together with associated ions of fission products from the solution.

References Cited in the file of this patent

Freundlich: Colloid and Capillary Chemistry (translation by Hatfield), pp. 220-222 (1922). Publ. by E. P. Dutton, N. Y.

Harvey et al.: Journal of the Chem. Soc., 1947, p. 1012.

Coryell and Sugarman: National Nuclear Energy Series, Div. IV, vol. 9, Book 3 (1951), pp. 1517, 1615, 1644.

AECU-836, The Removal of Plutonium From Laboratory Wastes (August 20, 1951), page 5.